(12) United States Patent
Heider et al.

(10) Patent No.: US 6,932,433 B2
(45) Date of Patent: Aug. 23, 2005

(54) HOPPER CLOSURE ASSEMBLY AND METHOD OF USING SAME

(76) Inventors: Dale J. Heider, 1108 8th Ave. SW., Humboldt, IA (US) 50548; Leon J. Heider, 1107 Third Ave. SW., Humboldt, IA (US) 50548

( * ) Notice: Subject to any disclaimer, the term of this patent is extended or adjusted under 35 U.S.C. 154(b) by 0 days.

(21) Appl. No.: 10/763,957

(22) Filed: Jan. 23, 2004

(65) Prior Publication Data

US 2005/0161994 A1  Jul. 28, 2005

(51) Int. Cl.7 .............................................. B60P 1/56
(52) U.S. Cl. ........................ 298/27; 414/548; 105/280; 105/247
(58) Field of Search ................... 298/24, 27; 414/467, 414/439, 548; 105/239, 280, 247–253, 282.1, 105/282.3, 305, 308.1, 286

(56) References Cited

U.S. PATENT DOCUMENTS

| 3,089,435 | A | * | 5/1963 | Floehr | 105/282.3 |
| 3,110,270 | A | * | 11/1963 | Ingram | 105/253 |
| 3,138,117 | A | * | 6/1964 | Dorey | 105/282.3 |
| 5,404,827 | A | * | 4/1995 | Baltz et al. | 105/282.3 |
| 6,085,948 | A | | 7/2000 | Putze | |

FOREIGN PATENT DOCUMENTS

JP           363064844      * 3/1988 ................. 298/24

* cited by examiner

Primary Examiner—H. Gutman
(74) Attorney, Agent, or Firm—McKee, Voorhees & Sease, P.L.C.

(57) ABSTRACT

A closure mechanism for a hopper bottom trailer which utilizes potential and kinetic energy of granular material in the hopper. The hopper closure assembly may have an angled member upon a gate that translates kinetic energy for moving granular material into longitudinal movement of the gate. The hopper closure assembly may have a raising structure which lifts the gate relative to the gate frame to create potential energy to assist in movement of the gate down the raising structure and in opening the discharge opening of the hopper. A method of using a hopper closure assembly which involves the steps opening the discharge opening by moving the gate longitudinally, also including the steps permitting the granular material to assist in opening the gate by striking the angled member, and additionally permitting the leading edge to move from the receiving member of the gate frame by descent from the raising structure.

24 Claims, 6 Drawing Sheets

HOPPER CLOSURE ASSEMBLY AND METHOD OF USING SAME

BACKGROUND OF THE INVENTION

The present invention relates to a closure mechanism for a hopper bottom trailer. Trailers used for handling grain or other bulk materials generally have a pair of spaced apart vertical sidewalls and a bottom wall having inclined front and rear portions. In the center of the bottom wall is usually mounted a hopper having a discharge opening at its lower end. In conventional trailer construction a longitudinal sliding gate which parallels a plane defined by the discharge opening is used to abut and close the discharge opening.

One disadvantage of the conventional sliding gate is that it is difficult to move when fully loaded with grain or other bulk materials. To move the conventional sliding gate a handle is typically provided and an operator provides the energy to move the gate. However, there is a tremendous reserve of energy in the hopper bottom trailer in both potential energy stored by grain elevated a distance above the gate and kinetic energy from the grain or other bulk materials moving out of the trailer once the gate is opened.

Prior attempts have been made to make conventional sliding gates easier to move; however, these do not utilize the potential and kinetic energy of the bulk material in the hopper to assist in moving a longitudinal sliding gate. Instead, the prior attempts have attempted to use a pendulum door system or a reduced friction system to assist in opening a hopper gate.

Therefore, a primary objective of the present invention is the provision of a closure assembly for a hopper bottom trailer which may utilize potential energy and/or kinetic energy stored in a trailer.

A further objective of the present invention is the provision of a closure assembly which maintains the gate and gate frame of the closure mechanism in sealing engagement when closed.

A still further objective of the present invention is the provision of a closure assembly which is economical to manufacture, durable in use and efficient in operation.

SUMMARY OF THE INVENTION

The foregoing objectives may be achieved by using a hopper closure assembly positioned adjacent the discharge opening and a hopper containing granular material. The hopper closure assembly having a gate frame surrounding the discharge opening and a gate operably mounted in the gate frame for movement along a longitudinal axis to open or close the discharge opening. In one embodiment, the gate frame has a raising structure that lifts a leading edge of the gate higher than a following edge of the gate. In this position, the gate is provided with potential energy to assist in moving the door away from the door frame when it is filled with granular material.

The foregoing objectives may also be achieved with a hopper closure assembly that utilizes an angled member upon the gate that translates kinetic energy from moving granular material into longitudinal movement of the gate relative the gate frame.

The features of both a raising structure and an angled member may be combined into the same hopper closure assembly.

The foregoing objectives may also be achieved by a method of using a hopper closure assembly which has the steps of closing the discharge opening by placing the angled member of the hopper closure assembly in sealing engagement with a receiving member of the gate frame, filling the hopper with granular material, opening the discharge opening by moving the gate longitudinally, and permitting the granular material to assist in opening the gate. The method also has the steps of the granular material striking the angled member of the gate. In addition, the method may have the step permitting the leading edge to move from the receiving member of the gate frame by descending down the raising structure.

DETAILED DESCRIPTION OF THE DRAWINGS

Figure 1:
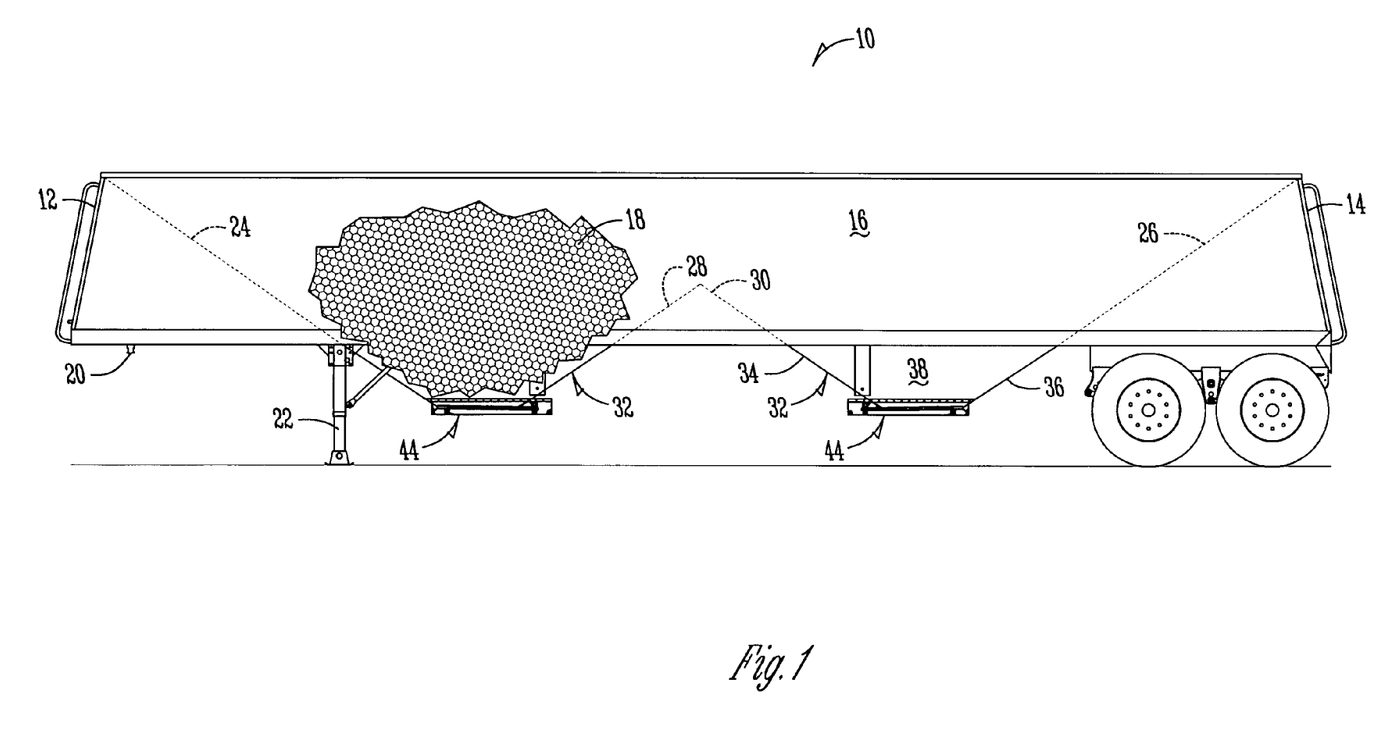
FIG. 1 is a side view of a truck trailer utilizing a closure assembly of the present invention.

As seen in FIG. 1, the numeral 10 refers generally to a hopper bottom trailer having a forward end wall 12, rearward end wall 14 and opposite side walls 16. The hopper bottom trailer is designed to haul granular material 18. The granular material 18 may be grain (i.e. corn, soybeans or other agricultural commodity), coal, fertilizer, meal, meat scraps, other non-liquid material, etc.

Trailer 10 includes a kingpin structure 20 at its forward end which is adapted to be connected to the fifth wheel of a truck (not shown). Trailer 10 also includes a jack assembly 22 at its lower forward end which is adapted to support the forward end of the trailer when the trailer is disconnected from the truck.

Bottom members 24 and 26 extend downwardly at a slope from the top edge of each end wall 12 and 14 toward the center of the trailer to the bottom edge of side walls 16. Bottom members 28 and 30 extend downwardly at a slope from the center of the trailer to the bottom edge of side walls 16. Bottom members 24, 26, 28 and 30 slope at an angle conducive to the flow of grain or other bulk materials down the slope to the hoppers 32.

Hoppers 32 are provided on the trailer. Although a pair of hoppers 32 is illustrated, any number of hoppers may be utilized. Further, although it is described that the hoppers 32 of this invention are utilized on a trailer, it should be understood that the hoppers would also function satisfactorily on a truck body. While the elements 32 are shown as being a hopper, they are generally open top containers and could be an open top tank, bin or hopper for stationary use or as parts of ocean shipping containers or other mobile conveyance, for storing, transporting or processing bulk material and could extend upwardly a greater distance than shown in the drawings and comprise a larger portion of the entire trailer than is presently shown.

Hopper 32 includes a forward wall 34, rearward wall 36, and opposite side walls 38, 40.

Figure 2:
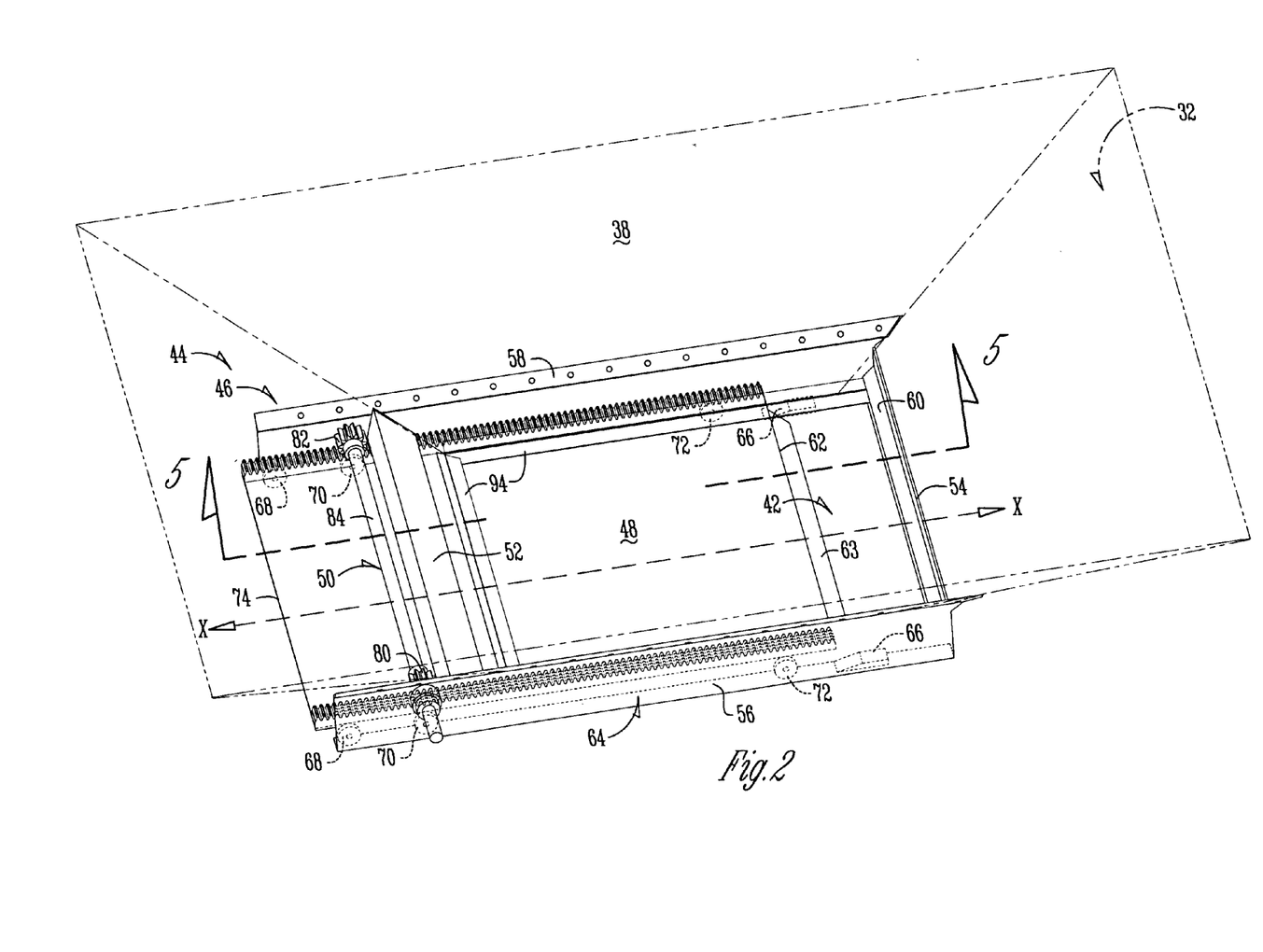
FIG. 2 is a perspective view of the closure assembly with the gate in a partially open position and the hopper shown in phantom lines.

As illustrated in FIG. 2, the forward and rearward walls 34, 36 and side walls 38, 40 extend downwardly and inwardly to form discharge opening 42. A hopper closure assembly 44 engages opening 42 and is moveable between a closed position and an open position.

The hopper closure assembly 44 has a gate frame 46 and a gate 48 mounted to the gate frame 46. A closure mechanism 50 moves the gate 48 between open and closed positions.

Figure 5:
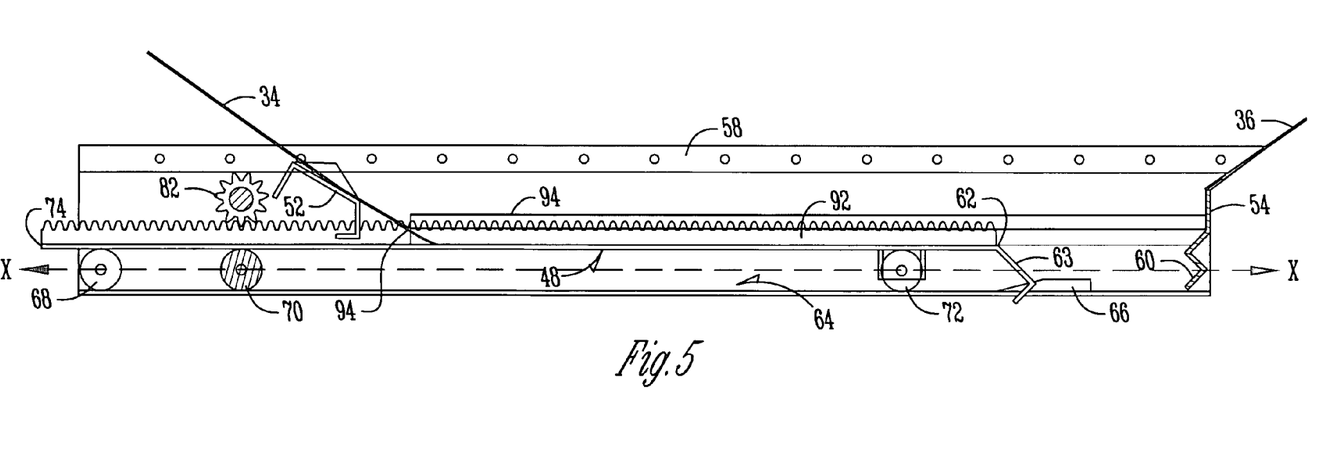
FIG. 5 is a sectional view of the closure assembly taken along lines 5—5 in FIG. 2 showing the gate in a partially open position.
Figure 6:
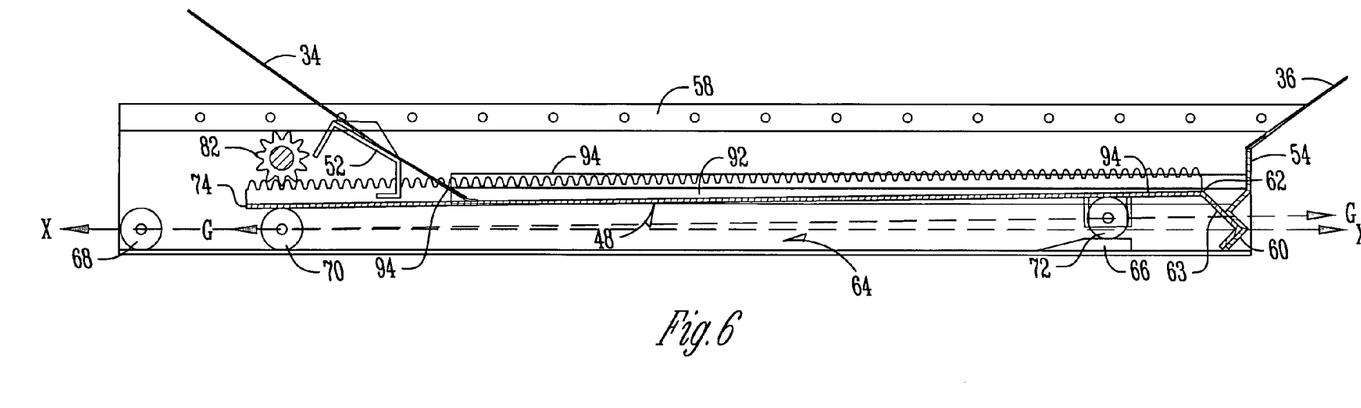
FIG. 6 is a sectional view of the closure assembly showing the gate in a closed position.

The gate frame has a first end wall 52, a second end wall 54 and first and second opposite sidewalls 56, 58. These walls 52, 54, 56, 58 define an opening to surround the discharge opening 42 of the hopper 32. A portion of these walls is out turned to match the angle of the hopper 32 walls. The gate frame 46 is attached to the hopper 32 by bolts, rivets, welding, or other fastening means. As seen in FIGS. 2, 5 and 6 the first end wall 52 has an angle which conforms to the hopper bottom front side 34. The first end wall 52 has a portion that extends between the first and second sidewalls 56, 58 while still permitting the gate 48 to move underneath it. The first end wall 52 therefore does not have the same height as sidewalls 56, 58 and permits the gate 48 to roll underneath it.

The second end wall 54 has approximately the same height as first sidewall 56 and second sidewall 58. The second end wall 54 of the gate frame 46 has a receiving edge 60. As seen in FIGS. 5 and 6 the receiving member 60 has a Z-shaped cross section. This Z-shape is designed to receive an L-shaped member 63.

Figure 3:
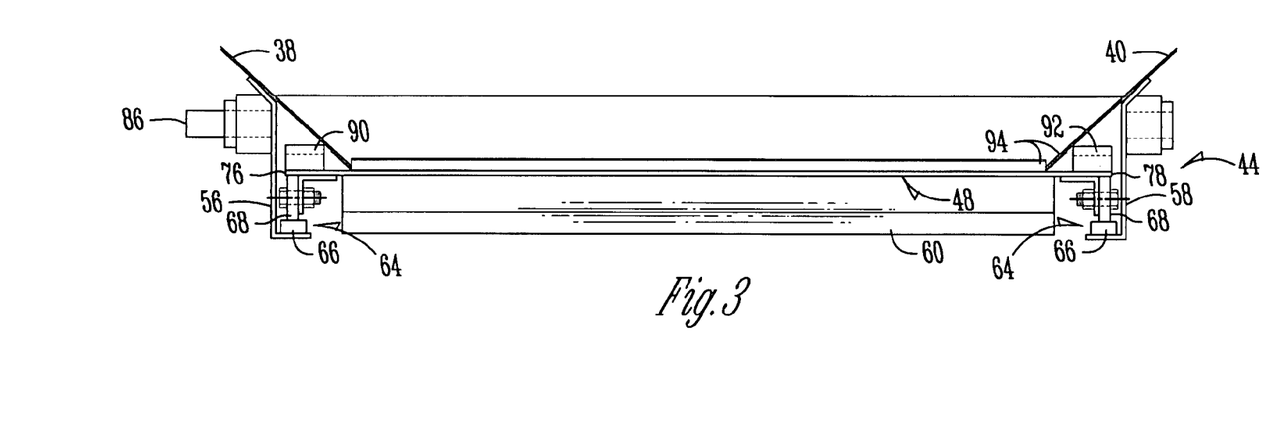
FIG. 3 is a front view of the closure assembly without the receiving member shown with the gate in the closed position.
Figure 4:
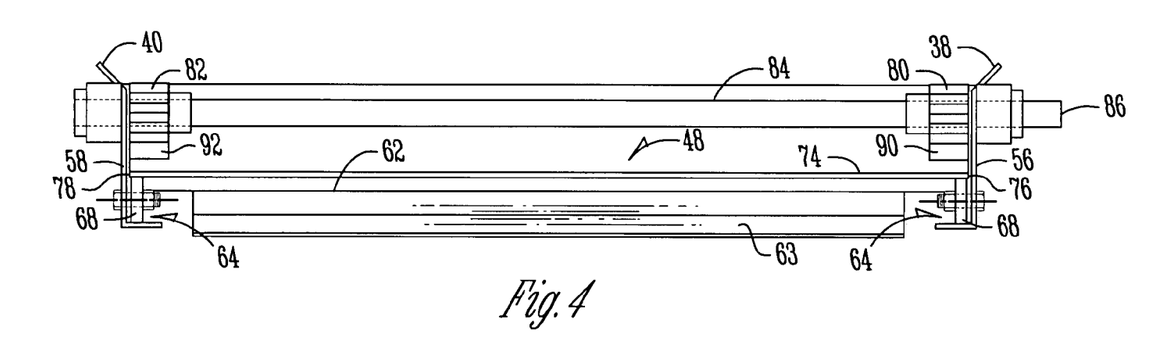
FIG. 4 is a rear view of the closure assembly with the gate in the open position.
Figure 8:
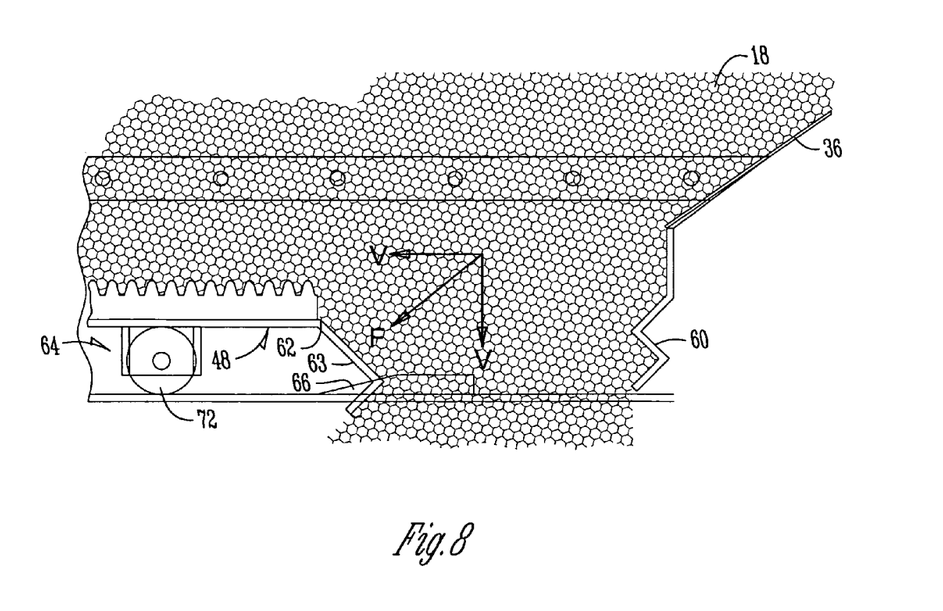
FIG. 8 is a side view of the slide gate utilizing the kinetic energy of granular material exiting from the hopper bottom.
Figure 9:
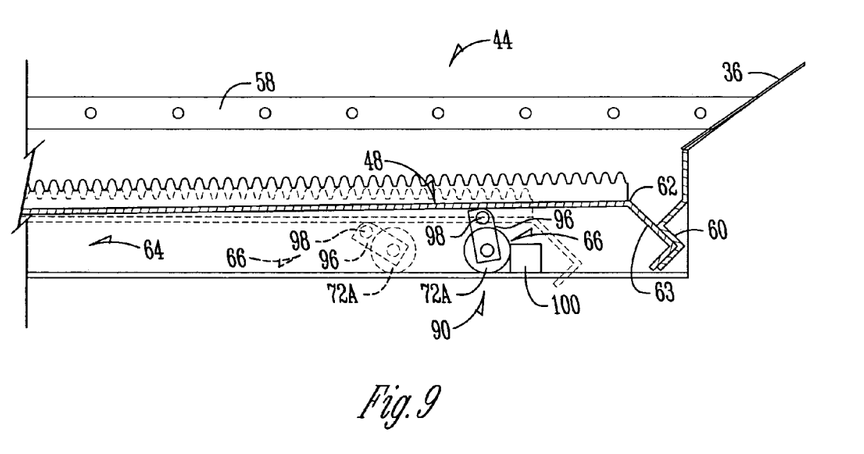
FIG. 9 is a side view of the slide gate illustrating an alternate embodiment of a raising member.

As shown most clearly in FIGS. 3 and 4, the first and second sidewalls 56, 58 have a lower edge that is turned inwards to form a raceway. As seen in FIGS. 2, 3 and 9, a raising structure 66 is placed within the raceway 64 in both sidewall 56 and sidewall 58. The raising structure 66 may be a ramp as illustrated in FIGS. 2, 3, 5–8, hinged swivel as illustrated in FIG. 9, or other raising structure that lifts the leading edge 62 higher than the following edge 74. The hinged swivel raising structure 66 as in FIG. 9 utilizes a swivel 96 attached by a hinge to the gate 48 and the wheel 72A. When the wheel 72A moves along the raceway 64 it contacts a block 100 which prevents longitudinal movement of the wheel 72A but permits the swivel 96 to move about the wheel and elevate the gate 48.

Additionally wheels 68, 70 are mounted to the sidewalls 56, 58 to accept the gate 48 traveling along longitudinal axis X—X as seen in FIGS. 2, 5 and 6. Additionally, the gate 48 has a wheel 72 mounted to it. When the gate 48 is traveling along longitudinal axis, wheels 68, 70 and 72 support the gate 48. As the wheel 72 travels up the raising structure as seen in FIG. 6, the gate is along gate axis G—G and supported by rear wheel 70 and wheel 72.

As previously mentioned, the gate 48 has an L-shaped member 63. The gate 48 also has a following edge 74 and first and second side edges 76, 78. The leading edge 62 is never below the following edge 74. When the wheel 72 is upon the raising structure 66 the leading edge 62 is above the following edge 74 and the gate is parallel axis G—G. When the gate wheel 72 is off the raising structure 66 and directly upon the raceway 64 the leading edge 62 is level with following edge 74 for the gate to be parallel longitudinal axis X—X.

The invention uses a closure generally referred to by numeral 50 to move the gate between the open position and the closed position. The closure 50 has first and second pinions 80, 82 connected by a cross bar 84. The cross bar extends outside the sidewall 56 to end in a shaft 86 that is approximately 1 inch long. Attached to the shaft 86 may be an elongated arm (not shown). The elongated arm is typically secured for rotation to the shaft 86 by a U-joint (not shown) so that rotation of the arm rotates the shaft 86 and in turn rotates first and second pinions 80, 82. The shaft may be rotated manually, hydraulically, pneumatically, or electrically.

As seen in FIGS. 3, 4, 5 and 6 rotation of pinions 80, 82 turn within first and second guideways 90, 92. The axis of rotation for the first and second pinion 80, 82 are in alignment with the second rear wheels 70. The gate 48 is moved between the rear wheels 70 and the first and second pinion 80, 82 by the pinions 80, 82 fitting within the guideways 90, 92. The guideways have a tooth face that resistively engage the pinion so that rotation of the pinion moves the guideway along the gate axis G—G when the front wheel is upon the raising structure 66 and along the longitudinal axis X—X once the gate wheel 72 comes off the raising structure 66. The first and second guideways extend the length of the gate 48 beginning at the first and second side edges 76, 78 and ending at the leading edge 62 when the L-shaped member 63 begins a downward angle.

Figure 7:
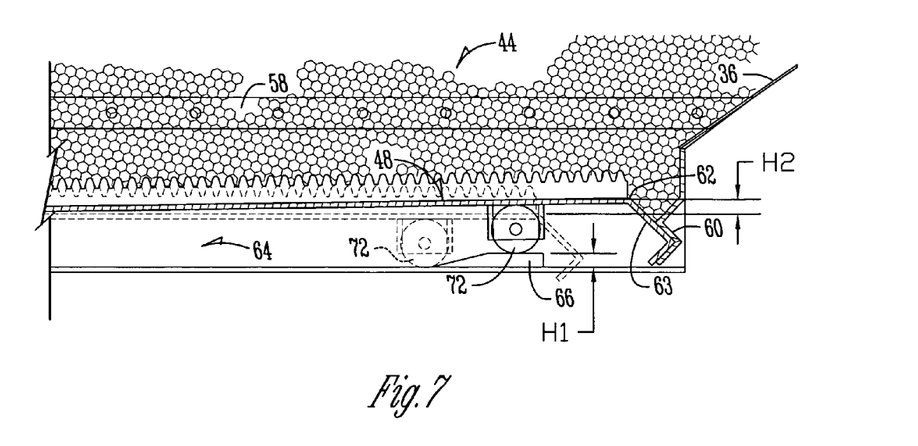
FIG. 7 is a side view of the slide gate illustrating the potential energy stored and utilized by the closure assembly.

As seen in FIG. 7, the leading edge 62 is an area with greater potential energy then the rest of the closure assembly 44. Potential energy is the energy waiting to be converted into power. The formula for calculating the potential energy (PE) for a height increase is PE=force*distance. In this case, the force is equal to the weight of stored grain or granular material above the closure assembly 44 times the acceleration of gravity (G), and the distance is equal to the height change so the formula for this invention can be written: potential energy=mass*gravity*change in height. When dealing with a loaded hopper bottom trailer the mass in the above equation is many thousand pounds and therefore even slight changes in height will produce a dramatic potential energy. As seen in FIG. 7, the raising structure 66 has a change in height, H1. The height difference H2 is achieved by riding the wheel 72 up raising structure 66.

Additionally, the invention uses kinetic energy to assist in opening the gate 48 within the gate frame 46. Kinetic energy takes into consideration the velocity of the granular material flowing onto the leading edge. Kinetic energy is calculated by the equation ½ mass*velocity$^2$. As seen in FIG. 8, the moving granular material puts force F on the gate 48 by striking the angled member 63 which has a horizontal component or vector V approximately equal to 0.707 F. The vector V may be altered by changing the angle of the angled member 63. As seen in the figures, the angled member 63 is pitched approximately 45 degrees from the gate 48.

Without the angled member 63 the force F would not act upon the gate 48 and would not assist in opening the gate 48. With the angled member, the kinetic energy or moving energy of the grain is transferred to the gate 48 as a force for movement along the longitudinal axis X—X.

While the angled member 63 is shown as a flat plate, it is to be understood that the angled member 63 may take other configurations including a rounded edge and other configurations which translate the force of downward moving granular material into a force for moving the gate longitudinally.

Seals 94 are provided to prevent any granular material from escaping from the inner connections between the hopper bottom sides 34, 38, 40 and the gate 48. The seal between the forward wall 34 and the gate 48 flexes as the gate moves between the open and closed positions.

In use, the operator uses the closure assembly 44 upon the hopper bottom trailer 10 by closing the closure assembly 44 while the hopper 32 of the hopper bottom trailer 10 is empty. When the hopper bottom 32 is empty the operator easily rotates arm to rotate the pinions 80, 82 to place the gate 48 having an L-shaped angled member 63 against the gate frame 46 having a receiving edge 60. When the hopper 32 is empty the operator can easily close the gate because the gate is turning upon wheels 68, 70 and 72. Just prior to closing the gate 48, that had been moving along a longitudinal axis, the leading edge 62 is elevated to form the gate axis G—G. When on the raising structure 66, the gate 48 is being moved upon a second rear wheel 70 and the gate wheel 72. The gate wheel 72 moves up a raising structure 66 positioned in a raceway 64 of the gate frame 46 to create this vertical movement. This vertical movement places the angled member 63 in scaling engagement with the receiving edge 60 to close the discharge opening 42 of the hopper 32.

The operator then moves the arm to a locked position where it will not accidentally disengage the gate 48 away from the gate frame 46.

The operator is then free to fill the hopper bottom trailer 10 with grain or other granular material. As grain 18 loads into the hopper 32 the grain 18 acquires a potential energy because the leading edge 62 is in a position higher vertically than the leading edge during longitudinal movement.

The operator empties the trailer 10 by opening the gate 48 on the hopper closure assembly 44. Initially, the operator moves the arm to a position from a locked position to an unlocked position which permits the potential energy to be translated into a weight force with a horizontal and vertical component. The gate begins moving downward and the wheel 72 begins rolling down raising structure 66. The gate 48 then tolls longitudinally assisted by the weight force of the granular material 18 acting on the angled member 63; the weight force exert a horizontal component force of the grain 18 moving against the angled member 63 and pushing the door 48 longitudinal. At the same time the operator moves the pinions 80, 82 by turning the arm to rotate the cross bar 84. The operator will open the gate to a desired opening to permit granular material flowing from the discharge opening 42, onto the ground, into an in ground auger, pit, conveyor, etc. The emptying will continue until the hopper bottom trailer is completely empty or until the desired amount of granular material 18 has been removed.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A hopper closure assembly for opening and closing a discharge opening in a hopper containing granular material, the hopper closure assembly comprising:
    a gate frame surrounding the discharge opening;
    a gate moveably mounted to the gate frame from a closed position in covering relation over the discharge opening to an open position uncovering at least a portion of the discharge opening for removal of the granular material through the discharge opening;
    the gate having a leading edge that moves across the discharge opening when the gate moves between the open and closed positions;
    a raising structure that engages and raises the leading edge of the gate when the gate moves to the closed position and that lowers the leading edge of the gate when the gate moves away from the closed position toward the open position.

2. The hopper closure assembly of claim 1 wherein the gate utilizes a weight force of the granular material acting on the gate to assist in movement down the raising structure.

3. The hopper closure assembly of claim 1 wherein the raising structure is a ramp.

4. The hopper closure assembly of claim 1 wherein the leading edge has an attached angled member and the gate frame has a receiving edge that accepts the angled member.

5. The hopper closure assembly of claim 1 further comprising a closure mechanism mounted on the gate frame to move the gate for opening and closing the discharge opening.

6. The hopper closure assembly of claim 5 wherein the closure mechanism has a rotatable member;
    an elongated arm having a secured end fixed for rotation with the rotatable member of the closure mechanism and a free end extending alongside the gate frame;
    a guideway attached to the gate having a toothed face and a smooth face, the guideway toothed face resistively engaging the rotatable member so rotation of the rotatable member moves the guideway longitudinally;
    a raceway mounted on the door frame;
    a roller wheel attached to the door forward the leading edge and rollingly engaging the raceway;
    roller wheels attached to the door frame and rollingly engaging the guideway smooth face.

7. The hopper closure assembly of claim 6 wherein the door frame has opposing side edges and opposing forward and rear edges; the raceway being mounted on the opposing side edges.

8. A hopper closure assembly for opening and closing a discharge opening in a hopper containing granular material that by gravity has a weight force extending toward the discharge opening, the hopper closure assembly comprising:
    a gate frame surrounding the discharge opening;
    a gate moveably mounted in approximately a horizontal direction to the gate frame from a closed position in covering relation over the discharge opening to an open position uncovering at least a portion of the discharge opening for removal of the granular material through the discharge opening;
    the gate having a leading edge that moves across the discharge opening when the gate moves between the open and closed positions;
    the leading edge having an angled member that angles away from the discharge opening and the granular material within the hopper, whereby the weight force of the granular material is in contact with the angled member in the closed position and engages the angled member during movement of the gate from the closed position to the open position and includes a horizontal component force that is in the direction of movement of the gate from the closed to the open position.

9. The hopper closure assembly of claim 8 further comprising a raising structure that engages and raises the leading edge of the gate when the gate moves to the closed position and that lowers the leading edge of the gate when the gate moves away from the closed position toward the open position.

10. The hopper closure assembly of claim 8 wherein the gate has a following edge opposite the leading edge, the leading edge approximately level with the following edge.

11. The hopper closure assembly of claim 8 wherein the angled member is L-shaped and the gate frame has a receiving edge that accepts the L-shaped member.

12. The hopper closure assembly of claim 10 further comprising a raising structure attached to the gate frame that lifts the leading edge of the gate relative the following edge.

13. The hopper closure assembly of claim 12 wherein the gate pivots upwardly from the following edge.

14. The hopper closure assembly of claim 12 wherein the leading edge of the gate is adapted to move downward from the raising structure to assist in opening the discharge opening.

15. A hopper closure assembly for opening and closing a discharge opening in a hopper containing granular material, comprising in combination:
   a gate frame engaging the discharge opening;
   a gate operably mounted in the gate frame for longitudinal and vertical movement;
   a leading edge on the gate adapted for vertical movement;
   a raceway upon the gate frame permitting longitudinal movement of the gate; and
   a raising structure within the raceway permitting the vertical movement of the leading edge.

16. The hopper closure assembly of claim 15 wherein the raising structure is a ramp.

17. The hopper closure assembly of claim 15 wherein the gate has a following edge opposite the leading edge, the following edge maintained approximately parallel the longitudinal axis when the leading edge is raised.

18. The hopper closure assembly of claim 15 wherein the leading edge of the gate is adapted to move downward from the raising structure to assist in opening the discharge opening.

19. A method of opening a hopper closure assembly having a hopper containing granular material and a discharge opening below the granular material whereby the granular material by gravity has a weight force directed toward the discharge opening, the method comprising:
   moving in approximately a horizontal direction a gate having a leading edge from a closed position wherein the gate covers the discharge opening to an open position wherein the gate opens the discharge opening to permit the granular material to move through the discharge opening;
   angling an angled portion of the leading edge of the gate away from the discharge opening whereby the weight force of the granular material acting on the angled portion while in the closed position will exert a horizontal component force on the gate in the direction of movement of the gate from the closed to the open position.

20. The method of claim 19 further comprising providing a raising structure upon the gate frame to elevate the leading edge of the gate, permitting the leading edge to move from the receiving edge by descent from the raising structure.

21. A method of opening a hopper closure assembly having a hopper containing granular material and a discharge opening below the granular material whereby the granular material by gravity has a weight force directed toward the discharge opening, the method comprising:
   moving a gate having a leading edge from a closed position wherein the gate covers the discharge opening to an open position wherein the gate opens the discharge opening to permit the granular material to move through the discharge opening;
   guiding the leading edge of the gate in a direction away from the discharge opening during movement of the gate from the closed to the open positions;
   providing a raising structure upon the gate frame to elevate the leading edge of the gate, permitting the leading edge to move from the receiving edge by descent from the raising structure.

22. The method of claim 21 further comprising the step angling an angled portion of the leading edge of the gate away from the discharge opening whereby the weight force of the granular material acting on the angled portion will exert a horizontal component force on the gate in the direction of movement of the gate from the closed to the open position.

23. A method of opening a hopper closure assembly, comprising:
   providing a hopper containing granular material and a discharge opening below the granular material whereby the granular material by gravity has a weight force directed toward the discharge opening;
   providing a longitudinal sliding gate which parallels a plane defined by the discharge opening;
   providing a downward angled leading edge upon the sliding gate, the leading edge exposed to the granular material when the gate is in a closed position wherein the gate covers the discharge opening;
   providing a raising structure upon the gate frame to elevate the leading edge of the gate, permitting the leading edge to move from the receiving edge by descent from the raising structure;
   moving the gate from the closed position to an open position wherein the gate opens the discharge opening to permit the granular material to move through the discharge opening;
   interacting the granular material with the gate to assist in movement;
   guiding the leading edge of the gate in a direction away from the discharge opening during movement of the gate from the closed to the open position.

24. The method of claim 23 further comprising angling an angled portion of the leading edge of the gate away from the discharge opening whereby the weight force of the granular material acting on the angled portion will exert a horizontal component force on the gate in the direction of movement of the gate from the closed to the open position.

* * * * *